United States Patent [19]
Montalvo, Jr.

[11] 3,964,583
[45] June 22, 1976

[54] MOUNTING OF CYLINDERS IN FRICTION BRAKES AND CLUTCHES

[76] Inventor: Edwin J. Montalvo, Jr., 283 Anderson St., Hackensack, N.J. 07601

[22] Filed: Jan. 15, 1975

[21] Appl. No.: 541,126

[52] U.S. Cl. .......................... 192/85 AA; 192/70.13; 188/73.6; 188/352
[51] Int. Cl.² ........................................... F16D 25/00
[58] Field of Search ........ 192/85 A, 85 AA, 85 AB, 192/70.13, 70; 188/73.6, 73.2, 72.5, 352

[56] References Cited
UNITED STATES PATENTS

| | | |
|---|---|---|
| 3,359,994 | 12/1967 | LaPointe.......................... 188/352 X |
| 3,432,007 | 3/1969 | Hillegass............................ 188/73.6 |
| 3,584,717 | 6/1971 | Suppes et al......................... 192/70 |
| 3,696,900 | 10/1972 | Montalvo............................. 192/70 |
| 3,727,638 | 4/1973 | Zaremba et al................ 188/352 X |

*Primary Examiner*—Benjamin W. Wyche
*Attorney, Agent, or Firm*—Brooks Haidt Haffner & Delahunty

[57] ABSTRACT

Friction brakes or clutches having pivotable or dismountable pods carrying friction members are provided with standard pods having adapters for use in brakes and clutches of various sizes. The standard pod can be used without adapters in small installations and with adapters in larger units. Simplified valve and fluid connection arrangements are employed.

9 Claims, 10 Drawing Figures

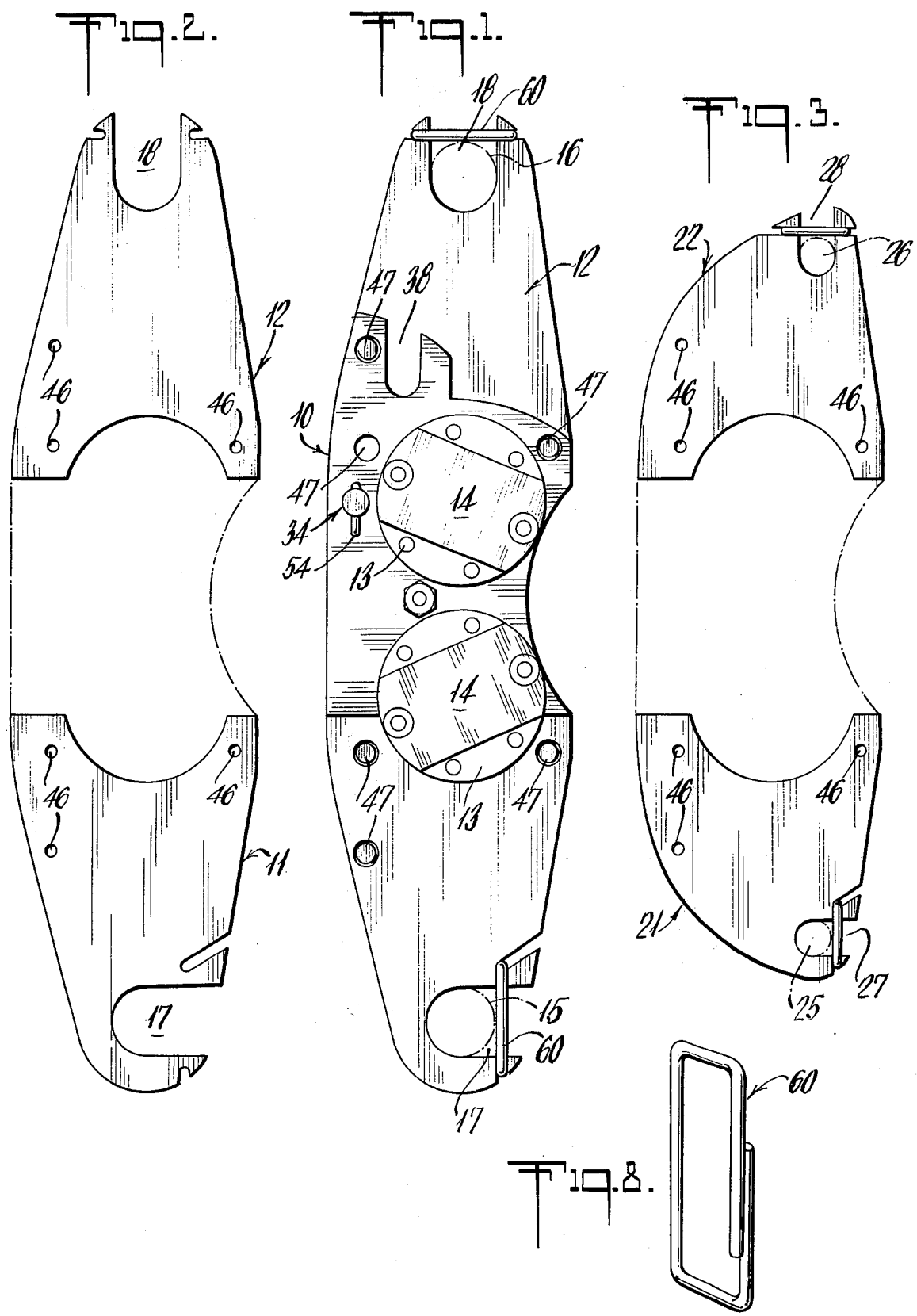

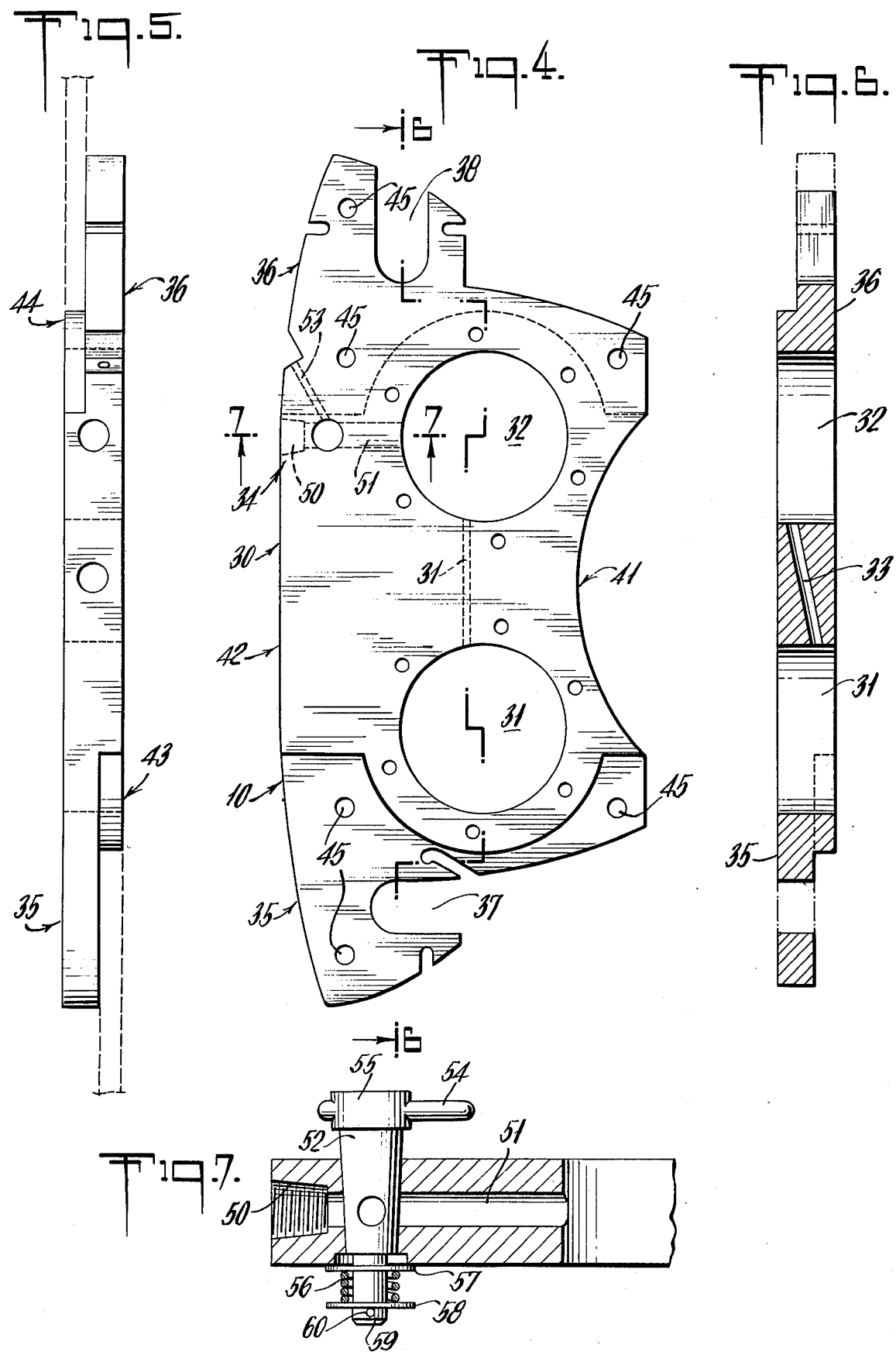

MOUNTING OF CYLINDERS IN FRICTION BRAKES AND CLUTCHES

BACKGROUND OF THE INVENTION

1. Field of the Invention

The invention relates to the mounting of friction members in brakes and clutches and more particularly to a simplified arrangement employing a standard pod carrying friction members and adapted for use in a wide variety of applications.

2. Description of the Prior Art

Brakes and clutches of a type having fluid activated friction members positioned between a pair of discs for engagement upon outward movement of the friction members parallel to an axis of rotation have been described in U.S. Pat. Nos. 3,237,783 and 3,311,205. Brakes and clutches of this type are compact and versatile and have a wide variety of applications including use in conjunction with machinery for handling web materials.

The housing of the cylinders of the pistons carrying friction members in brakes and clutches of this type in pivotable and removable sector-shaped bodies, as described in U.S. Pat. Nos. 3,584,717 and 3,696,900, facilitates inspection and replacement of friction pads. Such pivotable and dismountable assemblies make replacement of worn or damaged parts possible even while a machine continues to operate.

Brakes and clutches having pivotably mounted sector shaped bodies carrying the actuating means for friction members have been made in a variety of sizes for different applications, involving, for example, a wide range of torques to be accommodated. Prior to the present invention, the pivotable bodies having working elements have been made with various dimensions for different size brakes and clutches.

SUMMARY OF THE INVENTION

The present invention provides a simplified and improved mounting arrangement for friction coupling mechanisms employing piston and cylinder assemblies arranged between opposed plates, such as those disclosed in U.S. Pat. Nos. 3,237,783 and 3,311,205. This invention represents an improvement of the pivotable and removable mounting arrangements of U.S. Pat. Nos. 3,584,717 and 3,696,900. All of the aforesaid U.S. patents are assigned to the assignee of this application and the disclosures thereof are hereby incorporated herein by reference in their entireties.

The mounting arrangement of the present invention can be adapted to various kinds of brakes and clutches such as caliper type brakes, but it is particularly effective in brakes and clutches having two generally annular plates having spaced, opposed friction surfaces secured to a hub for rotation therewith. In such brakes and clutches, pistons operable to thrust friction pads outwardly into frictional engagement with the friction plates can be slidably fitted within cylinders, singly or in pairs, back to back, for outward movement to engage the plate surfaces. In U.S. Pat. No. 3,696,900, pods housing such cylinder and piston assemblies are shown mounted for pivotal movement or removal. In accordance with the present invention a "universal" or standard pod is provided, which can be adapted for use in brakes and clutches of widely differing sizes. The use of such a standard pod reduces the required inventory and simplifies manufacture with resulting economies in cost.

A standard pod in accordance with the invention has a generally flat body with a pair of spaced bores therethrough to accommodate piston and cylinder assemblies for actuating friction pads into contact with plates. The ends of the pod, outwardly of the locations of these boxes, are stepped in opposite directions, that is, the ends are of less thickness than the body portion of the pod but each end has one face continuous with the face of the body portion. The stepped ends can receive flat adapter members to extend the length of the pod.

At each end there is a slot in the pod for the reception of a mounting pin. These slots preferably open in mutually perpendicular directions for pivotal movement of the pod upon loosening of a mounting pin. Retaining clips can be provided to releaseably secure the pods in place.

The body portion of the pod houses a novel built-in fluid supply valve for controlling the flow of actuating fluid to the cylinders.

To adapt the universal pod to use in larger brakes and clutches, the stepped end portions will accommodate platelike adapter members. These members generally resemble the ends of the pod itself in that they have slots for fitting on mounting pins to permit pivoting and removal of the assembly. The position of the valves is directly associated with the cylinder location and does not interfere with the adapter member. When a brake or clutch of any given size is to be assembled, the pods to be used can be readily fitted with adapter members as required for the application.

These and other features and advantages of the mounting arrangement of the invention will be more fully understood from the following detailed description of the invention, especially when that description is read with reference to the accompanying figures of the drawing.

BRIEF DESCRIPTION OF THE DRAWING

FIG. 1 is a plan view of a standard pod of the invention fitted with adapter members;

FIG. 2 shows the adapter members of the arrangement of FIG. 1;

FIG. 3 shows adapter members for a smaller brake or clutch;

FIG. 4 is a plan view of a standard pod of the invention with the position of a valve shown in dashed lines;

FIG. 5 is a side view of the pod of FIG. 4 with the positions of adapter members illustrated by dashed lines;

FIG. 6 is a view in section of the pod of FIG. 4 taken along line 6—6 and looking in the direction of the arrows;

FIG. 7 is a detail view in section of a valve taken along line 7—7 of FIG. 4 and looking in the direction of the arrows;

FIG. 8 is a view in detail of a clip;

DETAILED DESCRIPTION OF PREFERRED EMBODIMENTS

Figure 9:
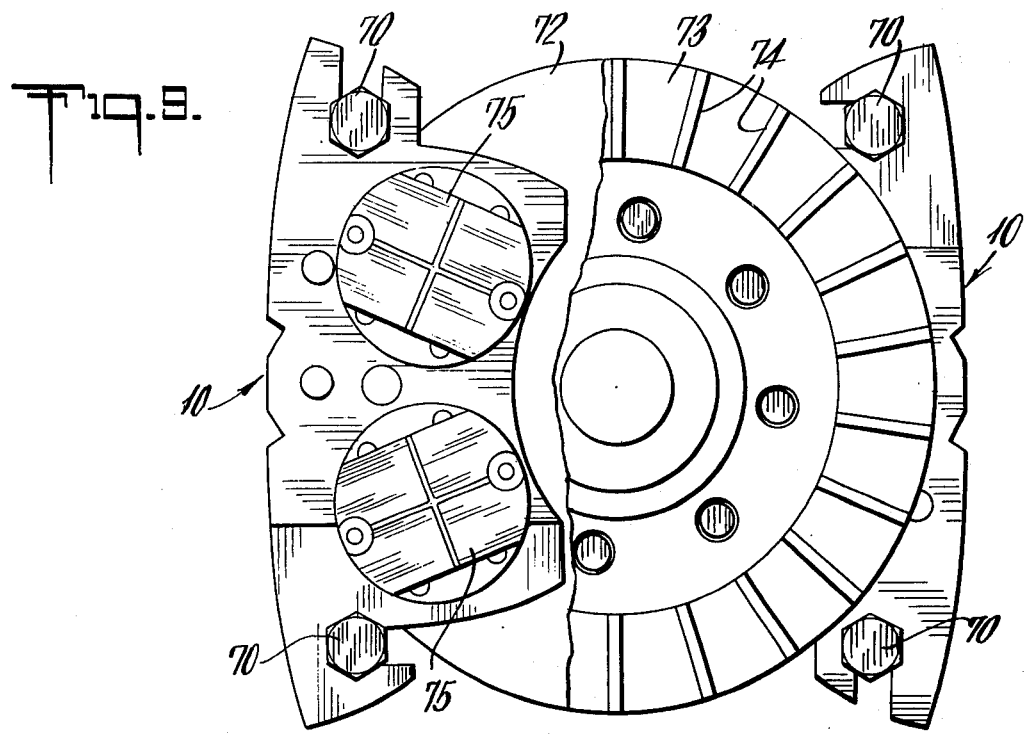
FIG. 9 is an illustration, partly broken away, of a small clutch assembly having two sets of the universal pods of the invention.

A universal pod assembly 10 is shown in FIG. 1 fitted with adapter members 11 and 12. FIG. 2 shows the adapter members 11 and 12 without the pod assembly 10. The mounting arrangement of the invention is particularly intended for use in friction coupling mechanisms, i.e., brakes and clutches, of the type wherein pistons mounted in cylinders housed in a pivotable and removable pod are selectively engageable with friction plates, as shown for example in U.S. Pat. No. 3,696,900. FIG. 1 shows the front faces 13 of two pistons, each equipped with a friction pad 14 housed in the pod assembly 10 for outward motion to engage an opposed member such as a disc upon actuation. Since suitable piston and cylinder assemblies have been described in U.S. Pat. Nos. 3,237,738; 3,311,205; and 3,584,717, it is not necessary to describe here the structure and operation of the cylinder assemblies associated with the pistons indicated generally at 13 in FIG. 1. It will suffice to note at this point that the pistons 13 and associated actuating mechanisms are of the fluid actuated type, and can be assemblies of two pistons back to back as shown in the aforementioned U.S. patents or single pistons, each mounted in its own cylinder for fluid actuation.

Studs 15 and 16 are shown in cross section in FIG. 1, received within slots 17 and 18 respectively, provided at the end portions of the adapter members 11 and 12 remote from the universal pod assembly 10. The pod 10 with its adapters 11 and 12 is pivotably and removably mounted on the studs 15, 16 which can be considered as pivot pins, and the studs 15 and 16 themselves are secured to a mounting fixture, not shown in the drawing, for holding the pistons 13 in proper relationship with an opposed friction element in a brake or clutch. In the brake arrangement illustrated in U.S. Pat. No. 3,696,900, a mounting fixture and pivot pins are shown, and the studs 15 and 16 can correspond to the pivot pins shown in that patent, or could be studs mounted on some other suitable fixture for retaining frictional devices in working relationship to opposed members of a brake or clutch. Typical brakes and clutches incorporating the pods of the invention will be discussed below with reference to FIGS. 9 and 10.

In prior art friction coupling devices wherein a plurality of friction devices are removably and/or pivotably mounted between opposed friction discs, one or more pods have been mounted at their ends on pins. Since brakes and clutches are used in a wide variety of applications, calling for different numbers of pods in assembly and having friction discs of widely varying sizes, the pods employed in such prior art devices have of necessity been produced in a range of sizes suitable for the different applications. The standard or universal pod assembly 10 of this invention, by selective attachment of adapter members can be employed in clutches and brakes of all sizes in which such pivotable and/or removable pods can be used. The adapters 11 and 12 of FIGS. 1 and 2 are used to mount the pod assembly 10 in a large brake or clutch, and FIG. 3 shows smaller adapter members 21 and 22 for adapting the pod assembly 10 to an intermediate size brake or clutch. For the smallest contemplated brake or clutch, the universal pod assembly itself, without adapter members, as shown in FIG. 4, is directly mountable on pivot pins of the friction coupling device mounting means.

The adapter members 21 and 22 shown in FIG. 3 have slots 27 and 28 for mounting on studs 25 and 26 and the universal pod assembly 10 as shown in FIGS. 1 and 4 has slots 37 and 38 at its ends. Before describing the adapter members of FIGS. 1-3 in detail, the universal pod assembly 10, illustrated in FIGS. 1 and 4-6 will be considered.

FIG. 4 shows the universal pod 10 to have a somewhat elongated central body 30, which body 30 is formed with two spaced, cylindrical bores 31 and 32 for reception of pistons 13 mounted in fluid actuated cylinders, for frictional engagement with an opposed member. As shown in FIG. 6, the bores 31 and 32 may be interconnected by a duct 33 through which the fluid chambers of cylinders mounted in the bores 31, 32 can communicate for concurrent actuation of pistons 13. Because of this interconnection, only one bore, shown as the bore 32, need have means 34 for introduction of fluid to actuate the pistons 13. The means for introduction and regulation of actuating fluid will be discussed in greater detail in conjunction with FIG. 7, but it can be noted here that the means 34 is located in the body 30 of the pod 10 so as not to interfere with the mounting of the pod 10 whether or not the pod 10 is fitted with adapter members.

At the ends of the body 30, the universal pod 10 has integrally formed slotted portions 35 and 36 which are formed respectively with the slots 37 and 38. The slots 37 and 38 open substantially perpendicular to each other, as do the slots 17 and 18, 27 and 28. This perpendicular relationship enhances the stability of the pod 10 which can be pivoted outward about the end 36 with the slot 38 still holding on to its pivot pin, yet permits easy removal of the pod 10 by disengagement of both slots 36, 38 from their pins.

It will also be noted that the inner side 41 of the body 30 has a concave profile, which reduces weight and affords clearance in case a shaft of a relatively rotatable part of a brake or clutch is positioned inwardly of the pod 10. The outer side 42 of the body 30 and ends 35, 36 can have substantially smooth convex curvature, or the ends 35, 36 can be curved in profile with the outer side of the body 30 substantially straight as illustrated in the drawing. Generally speaking, the pod 10 is shaped to provide optimum strength with minimum mass. For lightness of weight combined with As the pod 10 can be of aluminum. As best shown in FIGS. 5 and 6 the end portions 35 and 36 are stepped in relationship to the body 30 of the pod 10. The ends 35, 36 are of less thickness than the body 30 but each end portion 35, 36 has one face continuous with one of the faces of the body 30. The stepped shape of the pod 10 accommodates the adapter members as indicated in dashed lines in FIG. 5.

Reverting to FIGS. 1-3, it will be seen that the adapter members 11 and 12 or 21 and 22 are formed at their inner ends to matingly interfit with the body 30 of a universal pod 10. The steps 43 and 44 between the body 30 and the end portions 35 and 36 have a portion profiled on a curve that is concentric with the bores 31 and 32 as shown in FIGS. 4 and 5 and the adapter members 11, 12, 21 and 22 have mating curved profiles at their inner ends.

Three fastener receiving holes 45 extend through each end portion 35 and 36 of the pod 10 for receiving fasteners to secure adapter members thereto. As seen in FIGS. 2 and 3 holes 46 through the adapter members 11, 12 and 21, 22 are spaced for alignment with the holes 45. Fasteners 47 are shown in FIG. 1. The fasteners 47 can be permanent, such as rivets, or could be removable fasteners in certain cases where one pod is to be removed and used in a different environment requiring different adaptation.

The universal pod 10 without adaptation is thus sized to fit the smallest of a line of clutches or brakes, with its slots 37, 38 engaging relatively closed spaced mounting pins. The end portions 35 and 36 are of reduced thickness and a plurality of pods 10 can be arranged end to end around a central axis with their ends overlapping as in the arrangement of U.S. Pat. No. 3,696,900, the end 35 of one pod 10 overlapping the end 36 of the next adjacent pod with the respective slots 37, 38 engaging a single mounting pin. It will be noted that in such an arrangement of several pods 10 the inwardly opening slot 37 can be closer to a workman facing the brake or clutch than the slot 38, when pivoting a pod 10 outwardly for inspection or replacement of friction pods 14. By addition of a pair of adapter members of appropriate size, the pod assembly 10 can be adapted to fit any of a range of larger brakes or clutches.

It has been noted that the means 34 for the introduction of actuating fluid to the cylinders of the pistons 13 is conveniently located in the body 30 of the universal pod 10. A preferred embodiment of a built-in valve is shown in detail in FIG. 7. FIG. 7 shows an internally threaded inlet 50 for air or other actuating fluid under pressure. The inlet 50 is threaded to receive a hose or the like leading to the pod from a source of fluid under pressure and suitable external cut off valves can be provided as required. The inlet 50 leads to a cylindrical passage 51 that runs through the body 30 of the pod 10 to communicate with the bore 32 for admitting fluid to a cylinder (not shown) housed in the bore. To open and close the passage 50, the generally conical valve stem 52 extends perpendicularly across the passage 51. FIG. 7 shows the valve stem 52 in pressure relief position. The valve stem 52 is formed with a generally T-shaped arrangement of passages and in the view of FIG. 7 one arm 53 of this T is directed toward the viewer, the base of the T (not seen in FIG. 7) is aligned with the passage 51 opening a path to the bore 32 for the outward flow of air or other fluid to a vent 53, best shown in FIG. 4. In this position of the valve stem 52, the path to the inlet 50 is closed. Turning the valve stem through 90 degrees from the position of FIG. 7 brings the arms of the T-shaped passage into registry with the passage 51 and closes the opening to the vent 53 for the charging of a cylinder in the bore 32 with pressurized fluid to actuate the piston 13. The means for turning the valve stem 52 from one position to another, and for holding the valve in position, include a valve lever 54 extending perpendicularly to the stem 52 through a widened portion 55 of the stem outside the body 30 of the pod 10, and a compression spring 56 held between two plates 57 and 58 on a cylindrical extension 56 of the valve stem 52 extending from the opposite side of the pod body 30 from the lever 54. Compression on the spring 54 holds the valve stem 52 against inadvertent movement. A pin 60 through the stem 59 holds the outer one of the plates 58 in place. The valve stem 52 can be a taper plug of heat treated Teflon (polytetrafluoroethylene).

The adapter plates of FIGS. 1, 2 and 3 can be formed of steel for strength and durability, but could be of some other material having these properties, and while it has been indicated that the pod 10 is preferably of aluminum, it could also be of steel or some other suitable material.

Another feature of the mounting arrangement, to prevent inadvertent disengagement of the pod assembly from its mounting, is the use of a clip 60 preferably of the type shown in detail in FIG. 8, fitted in notches as shown in FIGS. 1–4. After placement of the pod 10, with or without adapter members on the mounting pins, clips 60 of appropriate size will be secured in the notches to enclose the pins in their slots. Notches at the left-hand ends of FIGS. 1–4 are shown slanted for secure retention of clips 60. Clips 60 can be of springy metal.

FIG. 9 shows how the universal pods 10 of the invention can be employed in a clutch assembly for selectively coupling two relatively rotatable bodies or shafts. In this case, the mounting pins (heads or nuts 70 of which are shown) upon which the pods are mounted, are secured to a rotatable element not shown, for selective clutched engagement with a shaft 71 carrying an inner disc 72. There are four (i.e., two pairs) of pods 10 in the clutch assembly illustrated in FIG. 9, and some or all of the friction members 75 carried by the pods can be actuated for engagement at any given time. Outer discs 73 have radial, heat dissipating ribs 74. It will be seen that the pods 10 of each set of pods are located between the outer discs 73 on opposite sides of the disc 72 for engagement by fluid actuation of the friction members 75. The clutch of FIG. 9 is of a relatively small size. A smaller clutch sould employ less than four of the pods 10 of the invention, and a larger clutch could have more than four pods. For still larger clutches, the pods 10 can be fitted with adapter members as previously described.

Figure 10:
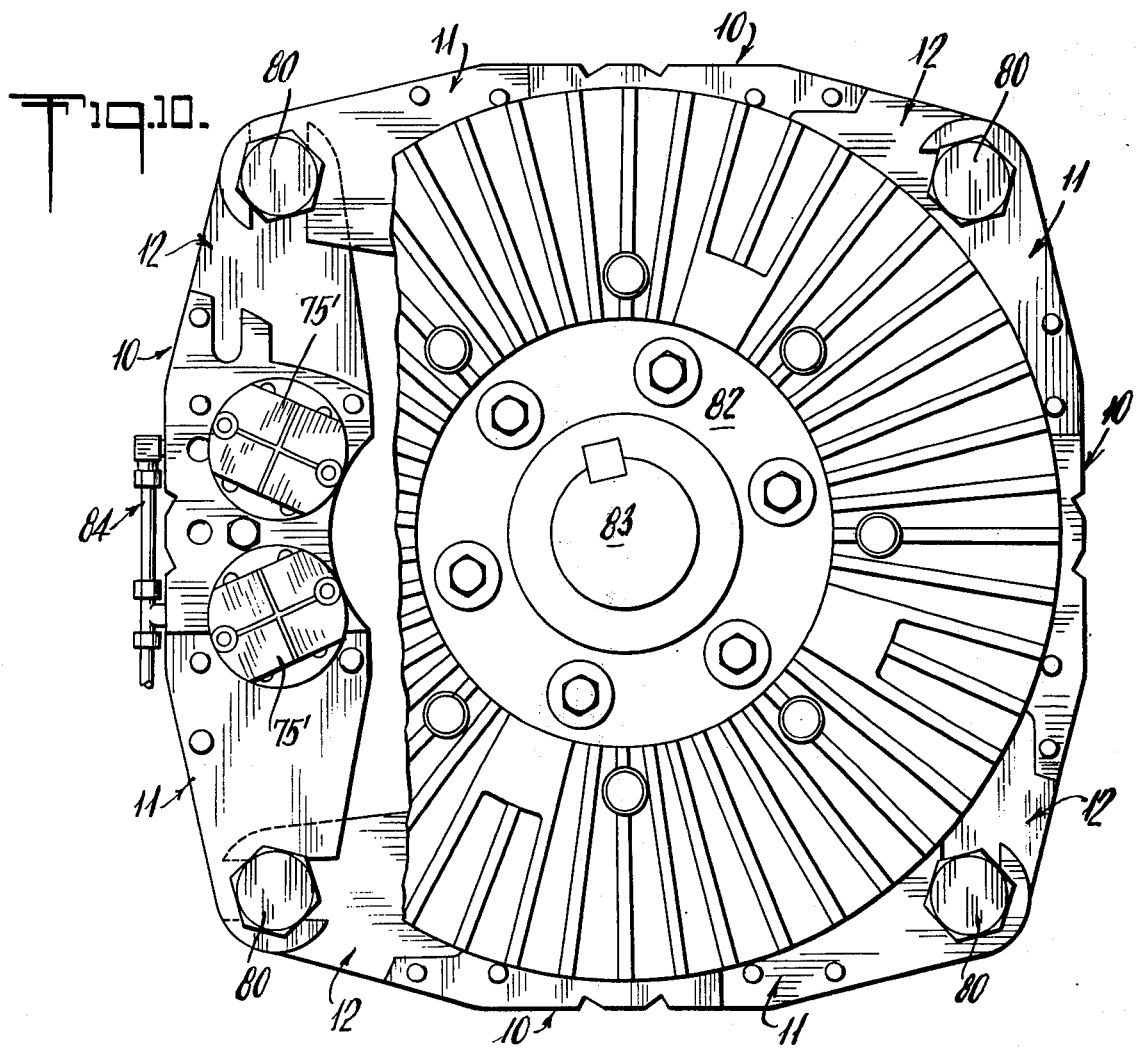
FIG. 10 is an illustration, partly broken away, of a large brake having four pods with adapters.

The brake assembly of FIG. 10 employs four of the pods 10, not arranged in pairs as in the clutch of FIG. 9, but all arranged end to end. As shown in FIG. 10, the pods 10 are equipped with adapter members 11 and 12, one member 12 overlapping each member 11 at each of the mounting pins (the heads or nuts 80 of which pairs are shown). The brake of FIG. 10 has two ribbed discs 81 on opposite sides of the pods 10, which discs 81 are secured to a hub 82 keyed to a shaft 83. The pods themselves are secured to a stationary fixture, not shown, so that upon actuation of friction members 75' carried by the pods 10, rotational movement of the discs 81 and shaft 83 is braked. The brake of FIG. 10 operates substantially as the brake of the aforementioned U.S. Pat. Nos. 3,237,738; 3,311,205; 3,584,717; and 3,696,900. As in the case of the clutch of FIG. 9, varying members of pods 10 can be employed in a range of brake sizes, with or without adapter members.

At the left in FIG. 10, some of the fluid piping 84 associated with the pod 10 is illustrated. Such piping carries actuating fluid to the cylinders of friction members 75' through the internal valve of FIG. 7 as previously set forth, and it will be seen that only a small area of clearance is required.

Clips 60 have been omitted from the illustrations of FIGS. 9 and 10 for clarity but the use of such clips in brakes and clutches of all sizes according to the invention may be preferred in some applications.

Various modifications, applications, substitutions of materials and the like will suggest themselves to those familiar with the art and such modifications, applications, substitutions and the like are within the spirit and scope of the invention. What has been described in terms of preferred embodiments is a universal pod and adapter mounting system for friction coupling mechanisms.

What is claimed is:

1. A pivotable and removable pod assembly for use in a friction coupling mechanism of the type wherein relative rotation between two bodies is controlled by selective engagement of friction members comprising, a pod having at least one bore therethrough for housing a fluid activated friction device, said pod having a slot opening outwardly near each of the ends of the pod, the slots being substantially perpendicular to each other whereby one end of the pod can be pivoted about a mounting pin in one of said slots while the other of said slots continues to surround a pin in said other slot.

2. The pod assembly of claim 1 and including means near the ends of said pod for the attachment of extension members, and extension members attached to said pod each of which extension members has a slot for mounting on a pin, the slots of said extension members opening outwardly in substantially mutually perpendicular directions.

3. The pod assembly of claim 1 wherein a fluid valve is mounted in said pod for opening and closing passages for fluid under pressure formed within said pod.

4. The pod assembly of claim 1 wherein there are two bores for housing friction devices, said bores being interconnected via a passage formed through said pod.

5. The pod of claim 1 including notches associated with said slots and pin retaining means in said notches for holding mounting pins in said slots.

6. A pod assembly for use in a friction brake or clutch having a body portion with bores therethrough for housing friction devices, and a pair of adapter members secured to end portions of said pod, said end portions and adapter members being of less thickness than said body portion and said adapter members overlying said end portions so that outer faces of said adapter members lie substantially coplanar with opposite faces of said body portion, and a slot near the end of each said adapter member remote from said body portion, the slots of the adapter members opening out in substantially mutually perpendicular directions.

7. The pod assembly of claim 6 including means associated with said slots for securing mounting pins within said slots.

8. The pod assembly of claim 6 including means defining passage for the flow of fluid under pressure through said pod body portion.

9. The pod assembly of claim 6 wherein cooperating curved profile portions of said body portion and adapter members are in contact with each other.

* * * * *

UNITED STATES PATENT AND TRADEMARK OFFICE
CERTIFICATE OF CORRECTION

PATENT NO. : 3,964,583
DATED : June 22, 1976
INVENTOR(S) : EDWIN J. MONTALVO, JR.

It is certified that error appears in the above–identified patent and that said Letters Patent are hereby corrected as shown below:

Col. 4, line 46, "For lightness of weight combined with" should read --For lightness of weight combined with strength the pod 10 can be made of aluminum.--

Col. 4, line 47, paragraph beginning "As the pod 10 can be of aluminum.", paragraph should begin --As best shown in FIGS. 5 and 6-- etc.

Col. 5, line 8, "engaging relatively closed spaced" should read --engaging relatively closely spaced-- .

Signed and Sealed this

Seventh Day of September 1976

[SEAL]

Attest:

RUTH C. MASON
*Attesting Officer*

C. MARSHALL DANN
*Commissioner of Patents and Trademarks*